(12) United States Patent
Brombach et al.

(10) Patent No.: US 11,552,498 B2
(45) Date of Patent: Jan. 10, 2023

(54) METHOD FOR CONTROLLING ELECTRICAL CONSUMERS OF AN ELECTRICAL SUPPLY GRID

(71) Applicant: Wobben Properties GmbH, Aurich (DE)

(72) Inventors: Johannes Brombach, Berlin (DE); Ingo Mackensen, Aurich (DE); Stefan Gertjegerdes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/268,905

(22) PCT Filed: Jul. 29, 2019

(86) PCT No.: PCT/EP2019/070316
§ 371 (c)(1),
(2) Date: Feb. 16, 2021

(87) PCT Pub. No.: WO2020/035294
PCT Pub. Date: Feb. 20, 2020

(65) Prior Publication Data
US 2021/0313828 A1    Oct. 7, 2021

(30) Foreign Application Priority Data
Aug. 16, 2018  (DE) ............... 10 2018 119 957.0

(51) Int. Cl.
*H02J 9/06*    (2006.01)
*B60L 55/00*   (2019.01)
(Continued)

(52) U.S. Cl.
CPC ............. *H02J 9/06* (2013.01); *B60L 55/00* (2019.02); *H02J 3/0012* (2020.01); *H02J 13/00002* (2020.01)

(58) Field of Classification Search
CPC ...... H02J 9/06; H02J 13/00002; H02J 3/0012; B60L 55/00
(Continued)

(56) References Cited

U.S. PATENT DOCUMENTS 8,922,056 B2 * 12/2014 Thisted .................. H02J 7/34
307/64
2020/0130527 A1   4/2020 Brombach et al.

FOREIGN PATENT DOCUMENTS

DE   102017108579 A1   10/2018
EP       2385606 A1   11/2011
(Continued)

OTHER PUBLICATIONS

Quint et al., "Power Quality Requirements for Electric Vehicle Chargers: Bulk Power System Perspective," *IEEE Power And Energy Society General Meeting (PESGM)*, Boston, MA, USA, Jul. 17-21, 2016, pp. 1-5.

*Primary Examiner* — Hal Kaplan
(74) *Attorney, Agent, or Firm* — Seed IP Law Group LLP

(57) ABSTRACT

A method for controlling an electrical consumer is provided. The electrical consumer is coupled to an electricity supply grid using a frequency converter. The electricity supply grid has a line voltage and is characterized by a nominal line voltage. The electricity supply grid is monitored for a grid fault in which the line voltage deviates from the nominal line voltage by at least a first differential voltage. When the grid fault occurs, the electrical consumer remains coupled to the electricity supply grid, and a power consumption of the electrical consumer is changed on the basis of the deviation of the line voltage from the nominal line voltage.

18 Claims, 3 Drawing Sheets

(51) Int. Cl.
    *H02J 13/00*        (2006.01)
    *H02J 3/00*         (2006.01)
(58) Field of Classification Search
    USPC .......................................................... 307/23
    See application file for complete search history.

(56)                References Cited

FOREIGN PATENT DOCUMENTS

| EP | 2 551 987 A1    | 1/2013  |
|----|-----------------|---------|
| JP | 2011-239670 A   | 11/2011 |
| JP | 2013-110848 A   | 6/2013  |
| JP | 2016-201966 A   | 12/2016 |
| WO | 2011/118187 A1  | 9/2011  |
| WO | 2017/145338 A1  | 8/2017  |

* cited by examiner

METHOD FOR CONTROLLING ELECTRICAL CONSUMERS OF AN ELECTRICAL SUPPLY GRID

BACKGROUND

Technical Field

The present invention relates to a method for controlling an electrical consumer in an electricity supply grid. The present invention furthermore relates to at least one such electrical consumer.

Description of the Related Art

By way of an electricity supply grid, electrical energy is generated by electrical generators such as large power plants or renewable energy sources, such as for example wind power installations, and transmitted to electrical consumers that require electrical energy to operate. Such electrical generators in this case not only have the task of generating the electrical energy, but they also have the task and option of ensuring stable operation of the electricity supply grid by virtue of the way in which they feed this electrical energy into the electricity supply grid. This also includes continuing to operate the electricity supply grid, that is to say continuing to feed into it, even in the event of a grid fault, such as a short circuit and/or a voltage dip.

If this is not possible in an exceptional case, the generators should at least be able to resume their normal operation as quickly as possible when a correspondingly serious fault has been rectified. Stable operation of the electricity supply grid should thereby be achieved again as quickly as possible, on the one hand, but the electricity supply grid should also be prevented from reverting to the fault after this fault has ended, on the other hand.

In addition to large power plants, there is nowadays also an increasing demand for renewable generators, such as wind power installations or solar generators, to likewise make a contribution to such grid support. These should as far as possible also continue to be operated in the event of a grid fault, or at least be reactivated quickly after a serious grid fault has passed.

In particular in the case of electricity supply grids with an increasing percentage share of renewable generators, in particular wind power installations, these renewable generators are therefore increasingly being allocated the task of ensuring grid support and also the described behavior in the event of a fault. Since wind power installations in particular are exposed to fluctuating weather conditions and may accordingly generate and feed in different amounts of power depending on the prevailing wind conditions, a necessary support power may therefore also turn out to be low. This in turn may mean that the corresponding installation is still able to contribute to the grid support only to a reduced extent. The stabilization of the electricity supply grid may thereby deteriorate, or it may at least be more difficult to guarantee there being a particularly high proportion of renewable generators in the electricity supply grid.

In the priority application for the present PCT application, the German Patent and Trade Mark Office searched the following prior art: DE 10 2017 108 579 A1.

BRIEF SUMMARY

A further measure or improvement for supporting the electricity supply grid, as much as possible including prior to, during and following a grid fault, is proposed for the electricity supply grid.

A method is provided. In particular, provided is a method for controlling an electrical consumer, wherein the electrical consumer is coupled to an electricity supply grid using a frequency converter. The electrical consumer thus draws electrical energy or electric power from the electricity supply grid via this frequency converter. By way of example, the frequency converter may be designed as an active rectifier if the consumer operates with a DC voltage, at least as an intermediate variable. However, it also comes into consideration for the electrical consumer to operate with an electrical AC voltage and for the frequency converter to convert the electrical AC voltage of the electricity supply grid into the desired electrical AC voltage for use by the consumer.

It is in particular assumed here that the electricity supply grid has a line voltage and is characterized by a nominal line voltage. It is also assumed that the electricity supply grid is an electrical AC current or AC voltage grid.

A particularly suitable electrical consumer that is coupled to an electricity supply grid using a frequency converter is a charging station, that is to say an electric charging point that supplies electric vehicles with electric DC current in order to charge the batteries, the vehicles drawing this DC current from the electricity supply grid using a frequency converter.

The method furthermore proposes for the electricity supply grid to be monitored for a grid fault in which the line voltage deviates from the nominal line voltage by at least a first differential voltage. A grid fault is thus identified through a significant deviation from the nominal line voltage. The first differential voltage may also be defined as a percentage value of the nominal line voltage, such as for example 20% of the nominal line voltage.

The line voltage does not need to be detected directly. It also comes into consideration for the significant voltage deviation to be identified elsewhere, in particular in the intermediate circuit voltage of the converter. The change in the power consumption of the electrical consumer on the basis of the deviation of the line voltage from the nominal line voltage may also be embodied by a change in the power consumption on the basis of the intermediate circuit voltage, because the deviation of the line voltage affects the power balance in the intermediate circuit and thus the intermediate circuit voltage.

If such a grid fault is then identified, that is to say if this at least significant differential voltage is present, the consumer is controlled such that it remains coupled to the electricity supply grid. This step thus already ensures that a jump in power is avoided by decoupling the electrical consumer. It has in particular been identified that such jumps in power may also additionally destabilize the grid, which is particularly unfavorable in the event of a grid fault that has already been identified. In addition, it has also been identified that a functioning electricity supply grid requires not only functioning and connected generators, but also functioning and connected consumers.

It is additionally proposed for a power consumption of the electrical consumer to be changed on the basis of the deviation of the line voltage from the nominal line voltage. The electrical consumer, in particular in this fault case, that is to say when the grid fault occurs, is thus able to support the stabilization of the electricity supply grid, which generators that are feeding in will certainly attempt to do. The electrical consumer may thus adjust its power consumption on the basis of the line voltage. It also in particular comes into consideration here for it to set or change a reactive power on the basis of the deviation of the line voltage. It also comes into consideration in this case for the electrical consumer to already have a power consumption that has an active component and a reactive component in the normal state. In particular in this case, the reactive component may be set on the basis of the deviation of the line voltage from the nominal line voltage. By way of example, it comes into consideration to set or change the reactive power such that this counteracts the deviation of the line voltage from the nominal line voltage. The electrical consumer is thereby also able to support the electricity supply grid, specifically in particular also the voltage, in this fault case by feeding in or drawing reactive power.

However, it also comes into consideration, in addition or as an alternative, for the active power or an active power component to be changed. By way of example, if the line voltage drops, the apparent power may be reduced in order thereby to counteract an overcurrent that could result from the voltage drop with the apparent power remaining the same.

In particular, due to the fact that the consumer remains coupled to the electricity supply grid and its power consumption takes into account the deviation of the line voltage from the nominal line voltage, unwanted load shedding in the event of a grid fault may in particular be avoided. In addition, or as a result, a frequency problem in the grid following a grid fault, which manifests itself as a voltage problem or may be referred to as a voltage problem, is also able to be avoided. Such a frequency problem may occur specifically due to the fact that there is suddenly an imbalance between the power fed in and the power consumed. The consumer particularly preferably behaves, in the event of a grid fault, in the same way as a modern wind power installation, wherein the consumer adapts its power consumption instead of power fed in.

According to one embodiment, it is proposed for the frequency converter to have a DC voltage intermediate circuit having an intermediate circuit voltage, for the intermediate circuit voltage to depend on the deviation, in particular the drop, of the line voltage and for at least one power control operation to be provided on the basis of the intermediate circuit voltage. This intermediate circuit voltage or even the DC voltage intermediate circuit is in this case in particular identified as an important control-related variable. The power consumption of the consumer may be controlled, at least controlled concomitantly, via the DC voltage intermediate circuit or the intermediate circuit voltage therein. The intermediate circuit voltage in this case often simultaneously provides information about power converted in the consumer and/or a change in the power converted in the consumer.

As a power control operation on the basis of the intermediate circuit voltage, there is provision for a power consumption of the electrical consumer to be controlled on the basis of the intermediate circuit voltage. For this purpose, there is in particular provision for a power setpoint value for the power consumption of the electrical consumer to be changed when the intermediate circuit voltage changes. It also comes into consideration for such a setpoint value to be specified at all only when a deviation, in particular a significant deviation, of the intermediate circuit voltage from a comparison value occurs.

This controlling of the power consumption on the basis of the intermediate circuit voltage is preferably performed on the basis of a predefined consumer droop. Such consumer droop specifies specify a linear relationship between the power consumption of the consumer and the intermediate circuit voltage, at least in sections. By way of example, if the intermediate circuit voltage drops by 5% below a lower limit value for the intermediate circuit voltage, a 10 percent power reduction may be provided, and if the intermediate circuit voltage deviates to an extent of 10 percent below this lower limit value, a power reduction of 20% may be provided, to further illustrate this example. The change in power of the consumer may thereby be implemented in a particularly simple and practical manner, because the intermediate circuit voltage also depends on the line voltage of the electricity supply grid, meaning that the power consumption of the electrical consumer is thereby also changed on the basis of the deviation of the line voltage.

An additionally or alternatively proposed power control operation concerns an uninterruptible power supply (UPS), which is supplied with power from the electrical intermediate circuit, but is also able to feed power into the intermediate circuit, and which forms an uninterruptible power supply for sub-consumers of the electrical consumer, such as for example a process computer, for which an uninterruptible power supply should be ensured as far as possible. For this uninterruptible power supply, it is proposed according to one variant for its power consumption or its power output to be controlled on the basis of the intermediate circuit voltage. It in particular comes into consideration here to provide a power infeed from the uninterruptible power supply to the DC voltage intermediate circuit if the intermediate circuit voltage drops below a lower threshold value. This infeed of power into the DC voltage intermediate circuit may then be increased further if the intermediate circuit voltage continues to drop.

It is in particular proposed to control the power infeed of the uninterruptible power supply on the basis of a predefined UPS droop. Such UPS droop specifies a linear relationship between the power infeed of the uninterruptible power supply (UPS) and the intermediate circuit voltage, at least in sections. The power consumption may thus be controlled in particular proportionally to a voltage deviation between the intermediate circuit voltage and a reference value of the intermediate circuit voltage.

In principle, it is thereby possible to ensure that the electrical consumer is able to be controlled or that said controllability is able to be at least partially maintained. The uninterruptible power supply in particular has its own energy storage unit. This uninterruptible power supply may also be designed such that it is supplied with electric power by its own supply connection and is provided only for supporting the intermediate circuit.

The uninterruptible power supply (UPS) may be dimensioned smaller than a battery for supporting the intermediate circuit voltage, because there is particularly preferably provision for the UPS to feed only as much power into the intermediate circuit as is required to operate the converter, in particular to feed in only as much power into the intermediate circuit as is required to compensate power loss. The UPS thus supports the intermediate circuit voltage and to this end receives energy via a charging circuit in particular with an external cable, via an external charging circuit. The auxiliary systems have to be supplied with power, such as for example circuit boards of the converter or a process computer, but this may also be achieved in other ways.

This controlling of the power consumption of the uninterruptible power supply on the basis of the intermediate circuit voltage may preferably also concern any power output. This is applicable specifically in the event that the uninterruptible power supply has its own energy storage unit and this is able to provide power when accordingly required. This power may then be fed directly into the DC voltage intermediate circuit, and this may also be controlled on the basis of the intermediate circuit voltage. This is also based in particular on the idea that an expected fault case often occurs only very briefly and that the uninterruptible power supply is able to provide some of its energy for grid support purposes for this brief occurrence. This may also mean that the uninterruptible power supply feeds part of its energy into the intermediate circuit in order thereby to supply power in full or in part to a consumer connected to the intermediate circuit, which thereby does not have to draw this energy component from the electricity supply grid.

Coupling between the uninterruptible power supply and the DC voltage intermediate circuit is preferably carried out via a DC/DC converter, in particular via a bidirectionally operational DC/DC converter. The bidirectionally operational DC/DC converter is provided so that the uninterruptible power supply has an energy storage unit from which power is also transferred into the DC voltage intermediate circuit. In addition or as an alternative, what is proposed as power control operation on the basis of the intermediate circuit voltage is to control a power consumption or output of a battery storage unit on the basis of the intermediate circuit voltage. A battery storage unit is provided in this case and is coupled to the DC voltage intermediate circuit. Such coupling may in particular be provided by way of a bidirectionally operational DC/DC converter.

Power may thus be drawn from the DC voltage intermediate circuit or be fed into said DC voltage intermediate circuit via the battery storage unit. The controlling of the power consumption of the electrical consumer is thereby in particular able to be controlled or supported on the basis of the deviation of the line voltage.

It is preferably proposed for the power consumption or output of the battery storage unit to be controlled on the basis of the intermediate circuit voltage on the basis of a predefined storage unit droop. The storage unit droop specifies a linear relationship between the power consumption or output of the battery storage unit and the intermediate circuit voltage. Thus, at least in sections, an exchange of power takes place between the DC voltage intermediate circuit and the battery storage unit in proportion to a deviation of the intermediate circuit voltage from a reference value, in particular a threshold value.

By virtue of such power controlling of the DC voltage intermediate circuit, there may also be provision for the DC voltage intermediate circuit to have sufficient power to control a reactive power. It therefore comes into consideration for the DC voltage intermediate circuit to receive active power, in particular from the uninterruptible power supply and/or the battery storage unit, and to use this essentially to provide a reactive power. For the provision, active power is required in particular to compensate or provide any power losses. The uninterruptible power supply is in particular intended to provide a support line when other loads, in particular all loads, have already been reduced to zero, so that the losses of the frequency converter are then covered by the UPS.

There is particularly preferably provision for controlling a power consumption of the electrical consumer on the basis of the intermediate circuit voltage on the basis of a predefined consumer droop, controlling a power consumption or power output of an uninterruptible power supply on the basis of the intermediate circuit voltage on the basis of a predefined UPS droop, and controlling a power consumption or power output of a battery storage unit on the basis of the intermediate circuit voltage on the basis of a predefined storage unit droop to be performed at the same time, that is to say in particular to be implemented at the same time. To this end, these three droops, specifically the consumer droop, the UPS droop and the storage unit droop, may be implemented at the same time, and the corresponding power control operation may be performed in parallel. It was in particular identified here that these three droops have the same input variable, specifically the intermediate circuit voltage, but drive different elements and provide power control at different locations. This allows these three control operations to be performed at the same time. It is particularly advantageous here for respective droops to be provided which, by virtue of their linearity, prevent these three concepts or the three controlled units from oscillating against one another.

According to a further embodiment, it is proposed for the electrical consumer to have at least one main consumer whose power consumption is able to be controlled and to have at least one auxiliary device, in particular at least one auxiliary device whose power consumption is not able to be controlled. For this purpose, it is then proposed, when the grid fault occurs, for the at least one auxiliary device to be supplied with electric power by way of a or the abovementioned uninterruptible power supply (UPS), in particular regardless of the deviation, in particular drop, of the line voltage, while the main consumer is supplied with electric power from the electricity supply grid on the basis of the deviation, in particular drop, of the line voltage. The power consumption of the main consumer is thus changed in order thereby to implement the overall proposed change in the power consumption of the electrical consumer on the basis of the deviation of the line voltage from the nominal line voltage. The auxiliary device whose power consumption is not able to be controlled then continues to maintain its power requirement, that is to say nothing is changed by the proposed change in the power consumption of the electrical consumer. Such an auxiliary device whose power consumption is not able to be controlled is preferably a process computer, the power consumption of which is not able or is barely able to be changed without changing its computing behavior and possibly no longer performing control processes. A measuring device that does not tolerate a change in power, or tolerates it poorly, or a data transmission device also come into consideration.

A main consumer, for example if the consumer is a charging station, may be the charging structure for charging all connected electric vehicles. It also comes into consideration in this case for each vehicle to be charged to be a main consumer in itself, or for just all electric vehicles that are currently being charged or are intended to be charged to be combined as one main consumer. Such a main consumer, whether this is then the individual electric vehicle or the electric vehicles being charged or to be charged that are combined into a group, may have its power consumption changed by virtue of the electric vehicles being charged to a greater or lesser extent. In this respect, this/there is/are one or more main consumers whose power consumption is able to be controlled.

Particularly noteworthy here is the combination and correspondingly targeted approach and corresponding control of one or more main consumers, on the one hand, and one or more auxiliary devices whose power consumption is not able to be controlled, on the other hand. Through this distinction, it is in particular also possible to achieve a situation whereby the electrical consumer is able in its entirety to respond to a grid fault, even to intervene in a supportive manner, without the occurrence of unwanted load shedding, specifically precisely of this electrical consumer.

The first differential voltage is preferably at least 10%, preferably at least 20%, of the nominal line voltage. This makes it possible to ensure that small fluctuations in the line voltage do not yet trigger fault identification. At the same time, the proposed values of 10% or 20% are simultaneously low enough to initiate the power consumption of the electrical consumer on the basis of the deviation of the line voltage already at an early enough stage in order thereby also to counter a grid fault as early as possible.

There is preferably provision for a second differential voltage that is greater than the first differential voltage and is preferably at least 50% of the nominal line voltage, in particular at least 70% of the nominal line voltage. Such a second differential voltage thus represents a second threshold, and it is proposed for the electrical consumer to be disconnected from the electricity supply grid if the line voltage drops below or exceeds the nominal line voltage by more than the second differential voltage. What is thus proposed is a two-stage method in which, in the first stage, the electrical consumer initially takes part in grid support. In a second stage, in which the grid fault has thus become so significant that it is no longer advantageous for the electrical consumer to support the electricity supply grid, possibly even endangering the electrical supplier, the electrical consumer is disconnected from the electricity supply grid. As values for the second differential voltage, it is proposed for these to be at least 50% of the nominal line voltage, in particular at least 70% of the nominal line voltage. This value, which applies to both the 50% and the 70%, is significantly high enough that a correspondingly serious error may be assumed. In particular with regard to the values of 10% or 20% of the first differential voltage, there is still a sufficiently large voltage range of the line voltage in which the electrical consumer is able to remain coupled to the electricity supply grid and its power consumption is able to be changed on the basis of the deviation of the line voltage from the nominal line voltage in order thereby to make a contribution to grid support in this range.

It has in particular also been identified that, starting from the value of 50%, especially if there is no electrical storage unit in the electrical consumer, no further power outfeed, that is to say power consumption from the electricity supply grid, is able to take place, or at most the losses of the frequency converter are still able to be covered so that the electrical consumer is then no longer able to be of any assistance in supporting the electricity supply grid, and decoupling it therefore appears expedient.

According to one embodiment, it is proposed for an electrical storage unit to be provided for the electrical consumer, in particular for the electrical storage unit to be part of the electrical consumer and, when the grid fault occurs, for the electrical storage unit to feed electric power into a or the DC voltage intermediate circuit in order thereby to provide power. The electrical storage unit is thus able to support the power consumption of the electrical consumer on the basis of the deviation of the line voltage from the nominal line voltage, or may even be used decisively for its implementation. For this purpose, it is proposed for the power provided by the electrical storage unit to be provided for the electrical consumer as such, in particular for a main consumer of the electrical consumer to be supplied with power in order thereby to partially or fully compensate a power reduction that was reduced on the basis of the deviation of the line voltage from the nominal line voltage.

In addition or as an alternative, it is proposed for the electrical storage unit to provide power for at least one or the auxiliary device. In particular, the auxiliary device, such as for example a process computer or a data transmission device, may be supplied with electric power by this electrical storage unit in the event of a grid fault. This auxiliary device may thereby also be supplied with power independently of the proposed change in the power consumption of the electrical consumer on the basis of the deviation of the line voltage. The auxiliary device is thereby able to perform its function without any changes.

In addition or as an alternative, it is proposed for the electrical storage unit to provide electric power for the infeed of reactive power into the electricity supply grid. It has in particular been identified here that feeding in reactive power also requires a certain amount of active power, and this may be provided by the electrical storage unit. This functionality of feeding in reactive power is therefore not dependent on power from the electricity supply grid. In particular, the electrical storage unit may provide the power loss required to generate reactive power.

According to one refinement, it is proposed, when the grid fault occurs, for the frequency converter to feed reactive power into the electricity supply grid or to draw it therefrom, and for the active power required to perform the reactive power infeed to be released by the electrical consumer by reducing its power consumption and/or to be provided by an or the electrical storage unit and/or by the electricity supply grid. This means that a reactive power may be fed in or drawn to support the voltage in particular. Whether the reactive power is fed in or drawn also depends on the definition of the reactive power. In any case, it is proposed for the reactive power to be fed in or drawn such that it counteracts the deviation of the line voltage from the nominal line voltage. The infeed of reactive power, which should also always be understood to mean drawing reactive power, may also mean that the magnitude of a reactive power already fed in or drawn prior to the grid fault is changed. Owing in particular to losses that occur, at least some active power is also required in order to feed in or draw reactive power. This may be provided by the supply grid or an electrical storage unit. If it is drawn from the supply grid, it may be particularly advantageous not to increase the power consumption of the electrical consumer any further, and for this purpose the consumer may reduce its power consumption, and thereby releases active power.

Furthermore or in addition, it is proposed for the reactive power to be fed in by way of a support current and for the support current to be controlled on the basis of an or the intermediate circuit voltage. A support current should be understood here in particular to mean a current component that is superimposed on the current that is drawn from the electricity supply grid in order to supply power to the electrical consumer. As an alternative, the total current drawn from the electricity supply grid may be understood as a support current, wherein the support current differs from the normal current that is used to supply the electrical consumer, particularly in terms of the phase position in relation to the line voltage. A phase shift may in particular in this respect be provided for feeding in or drawing the reactive current.

The amplitude of the support current, specifically in the sense of an effective value, may be limited on the basis of the line voltage. This is based in particular on the finding that, when the line voltage is reduced, greater effort is required in order to rectify the line voltage to the intermediate circuit voltage and thereby to continue to feed in a reactive current at the desired level. It has therefore been identified that reducing the current may make sense if it is already high at the time. This may be achieved through the proposed limitation of the support current on the basis of the line voltage.

The frequency converter preferably performs an intermediate circuit control operation in order to regulate an or the intermediate circuit voltage to a predefined intermediate circuit voltage value, and the frequency converter calculates an available exchange power and transmits this calculated value to the electrical consumer. It is thus proposed in this case for the intermediate circuit voltage to be regulated to a predefined intermediate circuit voltage value in order thereby to be able to provide an intermediate circuit voltage that is well suited for drawing electric power from the supply grid and, if necessary, also for feeding reactive power into the electricity supply grid or drawing it therefrom.

To the extent that the intermediate circuit voltage is regulated to the predefined intermediate circuit voltage value, this may also have an influence on identifying an available exchange power on the basis of the intermediate circuit voltage level. In the ideal case, the intermediate circuit voltage is kept at a fixed value, regardless of how much exchange power is available, so that the level of the intermediate circuit voltage then also does not allow any conclusions to be drawn about the available exchange power. It is accordingly proposed for the frequency converter to provide information about available exchange power to the electrical consumer, in particular to a main consumer of the electrical consumer. In particular by regulating the intermediate circuit voltage, the frequency converter is able to identify an available exchange power, which is specifically present in the DC voltage intermediate circuit, from the control relationships. This information is transmitted to the electrical consumer in order to further control same or to a corresponding control unit (controller) of the electrical consumer.

According to one embodiment, it is proposed for a power consumption of the electrical consumer prior to the occurrence of the grid fault to be stored as pre-fault value and, after the grid fault has ended, for the power consumption of the electrical consumer to be set to the level of the pre-fault value. It is thereby possible to achieve a situation whereby, after the grid fault has passed, the same operating point as was present prior to the grid fault is also as far as possible set overall. The same grid behavior as before the fault is thereby also able to be set as far as possible. It is in particular assumed that the electricity supply grid was basically at a stable operating point before the grid fault occurred and that this should also be stable again following the grid fault, if ideally all grid participants set themselves back exactly to the operating point.

This is also based in particular on the idea that grid stability is defined in particular by a balance between generated and fed-in power, on the one hand, and power drawn from the electricity supply grid, on the other hand. One particular difficulty following such a grid fault, for the generators feeding in, may be that of adapting their power to the consumption or, depending on the grid fault, targeted activation of consumers by a superordinate authority also comes into consideration in order to achieve such a balance, in particular if the grid fault has caused some load shedding to take place, that is to say some electrical consumers have disconnected from the electricity supply grid. To the extent that an electrical consumer, which is proposed in this embodiment, is able to return itself to the previous power-drawing state, this may help in establishing this power balance between generation and consumption in the electricity supply grid.

Such a pre-fault value may be established in particular by a correspondingly flexible consumer whose power is able to be at least briefly reduced and also increased again, or possibly vice versa, in a flexible manner. One example of such behavior would be an electric charging station that is able to reduce its power draw from the electricity supply grid by temporarily charging electric vehicles connected for charging purposes with less power, that is to say charging them more slowly. Likewise, the charging power may also be increased—within the scope of technical possibilities—such that electric vehicles are thus charged faster. If this is not possible because the electric vehicle excludes this, for example, or because it is possible only up to a certain limit, power from an electrical storage unit could be used.

It is therefore also proposed, according to one embodiment, to use an electrical storage unit to set the pre-fault value. This may perform a buffer function and thereby increase or reduce the overall power consumption of the electrical consumer briefly and also for a short time. This is particularly advantageous if some of the vehicles have disconnected from the charging point at a charging station during the grid fault. After the grid fault has ended, these vehicles may then initially not draw any power, so that it is more difficult overall for the charging station to return to the value of the power prior to the grid fault. This may be prevented by using the electrical storage unit.

In addition, if the charging power is greatly reduced, some vehicles may identify a fault and interrupt the charging process. In this case, other vehicles and/or the electrical storage unit may take up the additional power in order to establish the pre-fault value. The other vehicles and/or the electrical storage unit may be used to slowly increase the power to the new permanent value, in particular to increase it in a ramp-shaped manner over time to the new permanent value.

If the consumer is a charging station and has a pre-charging storage unit, this may be used as such an electrical storage unit and provide or consume the power. In addition or as an alternative, an electric vehicle connected for charging purposes or its electrical storage unit may also each be used as a storage unit that provides power in order to set the pre-fault value. For this purpose, a storage unit, including the storage units of several connected electric vehicles, may be used for control purposes. As a result, the electric vehicles may be used twice in order thereby to easily set the pre-fault value. It is thereby in particular possible to avoid having to provide an additional electrical storage unit.

According to one embodiment, it is proposed, in order to set the power consumption to the level of a or the pre-fault value after the grid fault has ended, for the power consumption to be set via a predefined change curve, in particular via a temporal ramp function with which the power consumption is changed linearly up to the level of the pre-fault value. This avoids sudden changes that could lead to a new grid fault.

It is therefore preferably also proposed for the electrical consumer to be designed as an electric charging station for charging electric vehicles. Such a consumer has high potential to change its power consumption and thus the draw of electric power from the electricity supply grid and also to change it in a targeted manner. The electrical consumer may also, in addition or as an alternative, be designed as a data center, refrigerated warehouse or factory. In principle, consideration is also given to other consumers that are supplied with electric power via a DC voltage intermediate circuit, especially those that were previously deactivated in the event of a voltage dip in the DC voltage intermediate circuit.

According to one embodiment, it is proposed for the electrical consumer to be designed as a support consumer using a frequency converter in order to support the electricity supply grid, taking into account at least one parallel consumer feeding into the same electricity supply grid. Such a support consumer is thus an electrical consumer that is prepared to support the electricity supply grid and in the process concomitantly takes into account the behavior of the parallel consumer, of which there may also be several. The parallel consumer is in this case in particular one that is not able to support the grid itself, in particular is not able to adapt its power to the line voltage in a targeted manner, and in this respect may be referred to as a passive consumer.

To this end, it is in particular proposed for the support consumer to identify a behavior, in particular a grid disconnection, of a parallel consumer feeding into the same electricity supply grid, that is to say of the passive consumer. The support consumer in particular identifies when the parallel consumer, that is to say in particular the passive consumer, has been disconnected from the electricity supply grid due to load shedding or a targeted deactivation due to an undervoltage, such as for example in the case of a data center as one example of a passive consumer, or for another reason.

In this respect, this parallel consumer, or passive consumer, is one that was not able to remain connected to the electricity supply grid when the grid fault occurred, whereas the electrical consumer, which is referred to here as support consumer, remains coupled to the electricity supply grid. The support consumer in this case knows and/or identifies at least the power consumption of the parallel consumer or of the passive consumer prior to the grid fault.

To this end, it is then furthermore proposed for the support consumer to change its power consumption on the basis of the deviation of the line voltage such that the total power consumption, as the sum of the power consumption of the parallel consumer and of the support consumer, changes in accordance with a predefined total power change. In this respect, the parallel consumer, together with the support consumer, is considered overall as a consumer, and a line voltage-dependent behavior may be predefined for this common consumer, even though the parallel consumer is not able to adapt its behavior. This part may thus be taken on by the support consumer, such that a predefined behavior may however be maintained as overall behavior for both consumers together.

Preferably, even a jump in power caused by load shedding of the parallel consumer and/or by reactivation of the parallel consumer is absorbed by the support consumer. Accordingly, the support consumer should have a sufficient sizing in terms of its performance, in particular in terms of its ability to change the absorbed power.

In addition or as an alternative, it is proposed, after the grid fault has ended, for the support consumer to set a power consumption such that the total power consumption attains the sum of the pre-fault values of the support consumer and of the parallel consumer. It is therefore also assumed here that the parallel consumer is not able to set its power. However, it may, in some cases necessarily, be disconnected from the electricity supply grid or reactivated. The support consumer may preferably compensate jumps in power associated with this disconnection and reactivation of the parallel consumer. It is thereby possible, in spite of the presence of consumers that are not able to control their power consumption, in any case are not able to control it to the extent that the support consumer can, but may nevertheless be taken into consideration and thus integrated into an overall concept, for the activation or deactivation thereof not to lead to any change in the power requirement.

In fact, they change the power requirement through being disconnected from the grid or being reactivated, but this change is compensated by the support consumer. In other words, the sum of the support consumer and of the parallel consumer, from the point of view of the electricity supply grid, is seen as the power of an individual consumer. A total power the same as prior to the grid fault is thus thereby able to be set for the support consumer and the parallel consumer together following the grid fault. It is thereby also possible in particular to improve the recovery phase of the electricity supply grid following the grid fault.

Proposed is an electrical consumer, in particular a charging station for charging electric vehicles. Such an electrical consumer has a frequency converter, wherein the electrical consumer is coupled to an electricity supply grid using the frequency converter. The electricity supply grid has a line voltage and is characterized by a nominal line voltage. In particular, in this case, electric power is drawn from the electricity supply grid via the frequency converter in order to supply power to the electrical consumer, wherein the frequency converter is able to control this drawing well.

What is furthermore provided is a monitoring unit (monitoring controller) that monitors the electricity supply grid for a grid fault in which the line voltage deviates from the nominal line voltage by at least a first differential voltage. For this purpose, the monitoring unit may be provided with a voltage detection device (voltmeter), or it may receive information about the voltage in some other way and then evaluate it (controller). It in particular comes into consideration for the frequency converter to perform voltage detection. Voltage detection on the frequency converter may in this case often provide information about the line voltage, even if further elements such as for example a transformer are intended to be interposed between the frequency converter and the electricity supply grid.

What is furthermore provided is an operating control unit that controls the electrical consumer such that the electrical consumer remains coupled to the electricity supply grid when the grid fault occurs. The operating control unit is in particular configured and set such that it does not initially provide for a grid disconnection in the event of voltage deviations, unless other reasons for a grid disconnection come into consideration. Such a further reason may be that the deviation of the line voltage for a nominal line voltage exceeds or falls below a second threshold value, meaning that a correspondingly high voltage deviation is detected. In any case, the operating control unit is configured such that it initially keeps the electrical consumer coupled to the electricity supply grid for as long as possible.

What is furthermore provided is a power control unit that changes a power consumption of the electrical consumer on the basis of the deviation of the line voltage from the nominal line voltage. Such a power control unit, just like the operating control unit, may be provided as a process computer. The operating control unit and the power control unit are preferably coupled to one another such that they are able to exchange information with one another and are able to coordinate with one another. There is preferably also coupling to the monitoring unit and to the frequency converter, meaning that these four elements are preferably coupled to one another in order to exchange information and coordinate with one another. In particular, the monitoring unit, the operating control unit and/or the power control unit may also be implemented for example as corresponding monitoring or control programs individually in a process computer, or be implemented together in a process computer.

The power control unit thus controls the power consumption, that is to say the amount of power that is drawn from the electricity supply grid by the electrical consumer, on the basis of the deviation of the line voltage, and thus not, or not exclusively, according to the ideal usage of the electrical consumer. The electrical consumer usually has at least one useful function, specifically charging electric vehicles when the electrical consumer is a charging station. An electrical consumer usually draws as much power from the electricity supply grid as it needs in each case to perform its useful function. It is also proposed here for the power control unit to control the power consumption of the electrical consumer on the basis of the line voltage, and thus to create a grid support capability for the electrical consumer.

The electrical consumer is preferably prepared to perform a method in accordance with one of the embodiments described above. In particular, the frequency converter, the monitoring unit, the operating control unit and/or the power control unit are prepared to perform the corresponding method steps.

According to a further embodiment, there is provision for
the frequency converter to have a DC voltage intermediate circuit having an intermediate circuit voltage,
the intermediate circuit voltage to depend on the line voltage, in particular on the deviation between the line voltage and the nominal line voltage, and
for at least one power control operation to be provided on the basis of the intermediate circuit voltage, in particular from the list comprising:
a power consumption of the electrical consumer is controlled on the basis of the intermediate circuit voltage,
in particular depending on a predefined consumer droop, wherein the consumer droop specifies a linear relationship between the power consumption of the consumer and the intermediate circuit voltage, at least in sections,
a power consumption or power output of an uninterruptible power supply (UPS) is controlled on the basis of the intermediate circuit voltage,
in particular depending on a predefined UPS droop, wherein the UPS droop specifies a linear relationship between the power consumption or output of the UPS and the intermediate circuit voltage, at least in sections, and
a power consumption or power output of a battery storage unit is controlled on the basis of the intermediate circuit voltage,
in particular depending on a predefined storage unit droop, wherein the storage unit droop specifies a linear relationship between the power consumption or output of the battery storage unit and the intermediate circuit voltage, at least in sections.

In particular, the intermediate circuit-dependent power control is implemented by the power control unit. Otherwise, with regard to the meaning and further explanations, reference is made to the above explanations regarding the corresponding embodiments of the method proposed.

The electrical consumer is preferably characterized in that it
has at least one main consumer whose power consumption is able to be controlled and
at least one auxiliary device, in particular at least one auxiliary device whose power consumption is not able to be controlled, and wherein
provision is made for an uninterruptible power supply (UPS) and, when the grid fault occurs, the at least one auxiliary device is supplied with electric power by way of the uninterruptible power supply (UPS), in particular regardless of a deviation of the line voltage from the nominal line voltage, in particular regardless of a drop in the line voltage, while
the main consumer is supplied with electric power from the electricity supply grid on the basis of the line voltage, in particular on the basis of the deviation of the line voltage from the nominal line voltage, in particular on the basis of the drop in the line voltage.

In particular, the interaction between the controllable main consumer and the auxiliary device is preferably achieved using the operating control unit. In this respect, the operating control unit operates in an overarching manner for individual elements of the electrical consumer. Otherwise, further explanations regarding explanations described above regarding embodiments of the claimed method become apparent analogously.

It is also advantageously proposed for
an electrical storage unit to be provided for the electrical consumer, in particular for the electrical storage unit to be part of the electrical consumer, and,
when the grid fault occurs, for the electrical storage unit to feed electric power into a or the DC voltage intermediate circuit in order thereby to provide power for at least one from the list comprising:
the electrical consumer,
at least one or the auxiliary device and
feeding reactive power into the electricity supply grid.

The electrical consumer thus has an electrical storage unit, which in particular also provides an electric reserve power that is able to be used directly for the electrical consumer, at least one of the auxiliary devices, and/or for feeding reactive power into the electricity supply grid. The above explanations with regard to corresponding embodiments of the method may be applied analogously here.

BRIEF DESCRIPTION OF THE SEVERAL VIEWS OF THE DRAWINGS

The invention is now explained in more detail below on the basis of embodiments with reference to the accompanying figures.

DETAILED DESCRIPTION

Figure 1:
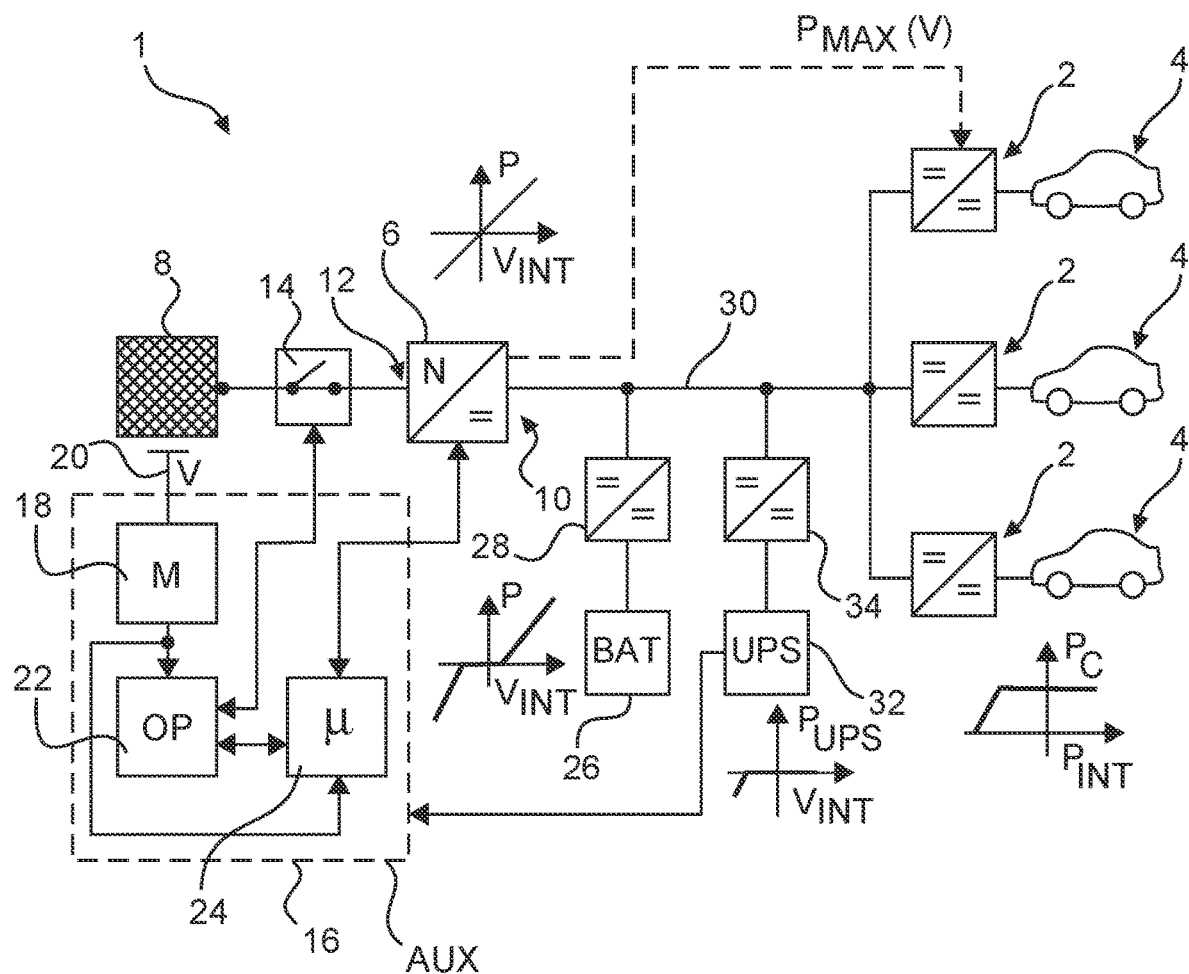
FIG. 1 shows a schematic illustration of a charging station as electrical consumer.

FIG. 1 shows a schematic illustration of a charging station 1. The charging station 1 has a plurality of charging terminals 2, each of which is symbolized as a DC/DC converter. Likewise illustratively, an electric vehicle 4 is connected to each charging terminal 2. It may usually of course be assumed that different electric vehicles are able to be charged, and the use of the same reference signs for the electric vehicles 4 is intended only to indicate that there is no need for a distinction in connection with the explanations of FIG. 1. The charging terminals 2 and the vehicles 4 should in this respect be understood to be essentially illustrative. More than three charging terminals 2 in particular also come into consideration. However, it also comes into consideration for no electric vehicle 4 to be connected to a charging terminal 2 at times.

In order to supply power to the charging terminals 2, provision is made for a frequency converter 6 that converts electric AC voltage from an illustratively shown electricity supply grid 8 into a DC voltage or a DC current that is available to the charging terminals 2 as an input voltage. The frequency converter 6 in this respect has a DC voltage intermediate circuit, which is not shown in detail, but for example the DC voltage symbol that is shown may in this respect also be representative of this DC voltage intermediate circuit. The frequency converter 6 in this case has a DC voltage output 10, which may be connected directly to the DC voltage intermediate circuit. In this respect, current is able to flow from the DC voltage output 10 and thus from the DC voltage intermediate circuit of the frequency converter 6 to the charging terminals 2, wherein it may for this purpose be divided among the individual charging terminals 2.

The frequency converter 6 is provided with an AC voltage input 12, by way of which it is coupled to the electricity supply grid 8 via a grid disconnection switch 14.

A control peripheral 16 (controller) is provided for control purposes and, in this respect, also forms an auxiliary device or contains auxiliary devices. In this respect, this control peripheral 16 may also be referred to as an auxiliary device (AUX).

The control peripheral 16 in this case comprises a monitoring unit 18 (controller), which has a sensor 20 (voltmeter or multimeter), which is illustrated symbolically and is able to detect a line voltage V of the electricity supply grid 8. In this respect, the monitoring unit 18 may monitor the electricity supply grid 8 for a grid fault, specifically depending on the level of the line voltage V. The monitoring unit 18 in this case supplies the results of the monitoring to an operating control unit 22 (controller) and a power control unit 24 (controller). In addition or as an alternative, the monitoring unit 18 may also transmit the detected voltage values V directly to the operating control unit 12 and the power control unit 24.

The operating control unit 22 is intended, inter alia, to drive the grid disconnection switch 14. This is illustrated by a corresponding connecting double-headed arrow between the grid disconnection switch 14 and the operating control unit 22. The double-headed arrow in this case illustrates that information may also be transmitted from the grid disconnection switch, in particular about its switch position, to the operating control unit 22.

The power control unit 24 in particular controls the overall power consumption of the charging station. This takes place in particular via corresponding driving of the frequency converter 6, and may take place on the basis of the line voltage or information about this. By way of example, the intermediate circuit voltage may provide information about the line voltage. In particular when the intermediate circuit voltage is known as well as the control of the converter based on which at a given intermediate circuit voltage power is drawn from the electricity supply grid, the line voltage may be derived directly or indirectly therefrom. The power control unit 24 may also receive this line voltage or information about this from the monitoring unit 18. However, it also comes into consideration for the frequency converter 6 itself to provide voltage detection of the line voltage V and to transmit information about this line voltage V thus detected or the detected line voltage V as such to the power control unit 24. For the frequency converter 6, a graph of controller droop is shown symbolically and provides a power control possibility that depends on the intermediate circuit voltage, which will be described further below. In this case, it would be possible to dispense with using the level of the detected line voltage. According to one embodiment, the level of the line voltage may in this case be incorporated into regulation of the intermediate circuit voltage as information, and such regulation is preferably performed in the frequency converter 6.

The charging station 1 furthermore also has a battery storage unit 26 (battery), which also serves as pre-charging storage unit in this charging station 1. It is basically coupled to the DC voltage output 10 of the frequency converter 6 via a storage unit converter 28. In general, a DC bus 30 may be provided for this purpose, and is connected to the DC voltage output 10 of the frequency converter 6 and thus connects various DC current sub-consumers, such as the charging terminals 2 and the storage unit converter 28.

In addition to the battery storage unit 26, a graph of controller droop is likewise shown illustratively, which is intended to symbolize that the battery storage unit 26 may have implemented intermediate circuit voltage-dependent power control, which will be explained further below. The battery storage unit 26 or its storage unit converter 28 may be driven accordingly for this purpose. Such driving may also be performed for example by the power control unit 24, which is however not shown in FIG. 1 for the sake of clarity.

Provision is furthermore made for an uninterruptible power supply 32 (uninterruptible power supply battery) that is connected to the DC bus 30 and thus to the DC voltage output 10 of the frequency converter 6 via a UPS converter 34. This uninterruptible power supply (UPS) 32 is able to drive auxiliary devices such as the control peripherals 16. The control peripherals 16, specifically in particular the monitoring unit 18, the operating control unit 22 and the power control unit 24, are essentially designed as process computers, and may also be wholly or partially combined in a practical embodiment, and tolerate only a small change in power, meaning that, even in the event of a grid fault, the uninterruptible power supply 32 is able to ensure a power supply to these control peripherals that is as far as possible unchanged.

Figure 2:
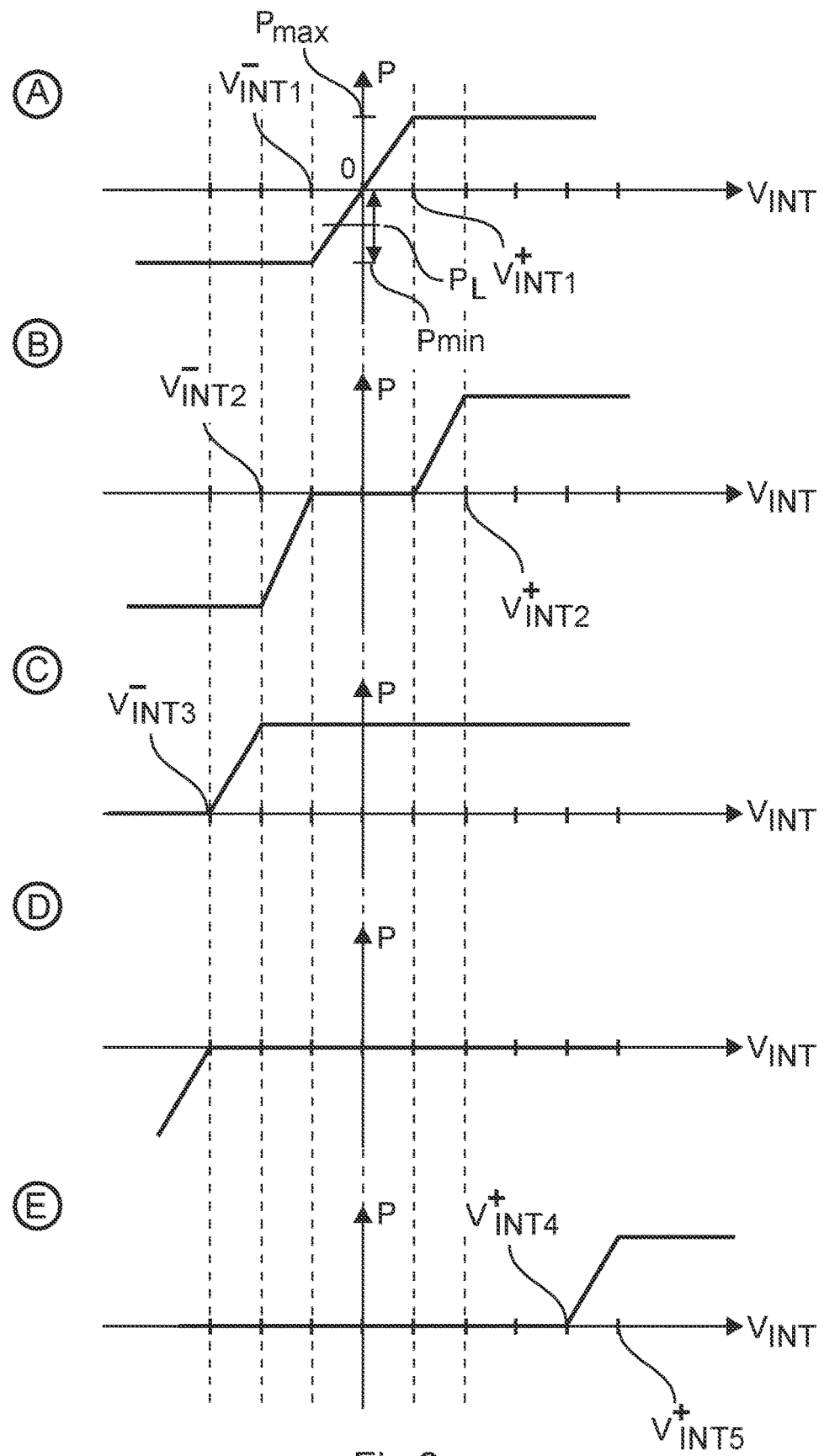
FIG. 2 shows various droops for intermediate circuit-dependent power control.

The UPS may however also be designed and/or used such that it covers only the losses of the converter. It may in this case be provided as an intermediate circuit UPS, which, as shown in FIG. 2, is connected to the intermediate circuit and feeds electric power into same in order to cover losses of the converter.

The uninterruptible power supply 32 may however also supply power to other auxiliary devices that are not illustrated here for the sake of simplicity, such as for example a communication device for transmitting information within the charging station 1 or else to an externally located central unit. A graph of controller droop is also indicated for the uninterruptible power supply 32, which graph symbolizes a power of the uninterruptible power supply as a function of an intermediate circuit voltage as a control relationship and is described in more detail later.

A graph of controller droop is also illustrated for the charging terminals 2, which graph symbolizes the power of the charging terminals 2 as a function of the intermediate circuit voltage, which is likewise described further below.

Another control option consists in specifying the respective maximum charging power able to be provided by the charging terminals 2, either individually or as a total power. This is symbolized by an arrow illustrated in dashed form, which extends from the frequency converter 6 to a charging terminal 2. However, this should be understood symbolically and should not only symbolize control of the one charging terminal illustrated at the top, but rather all of the charging terminals 2 should be able to receive this power limit as similarly as possible. It however also comes into consideration for a total power limit to be transmitted, which the charging terminals 2 divide among themselves.

FIG. 2 shows a plurality of graphs A to D for power control operations as a function of the intermediate circuit voltage of a frequency converter, specifically in particular of the frequency converter 6 of FIG. 1. These graphs, or the characteristic curves contained therein, may also each be referred to as controller droops. The graphs are particularly illustrative with regard to the power amplitude insofar as the individual graphs may have different scales with regard to the power, that is to say may have different amplitudes. The resolution of the intermediate circuit voltage, which is plotted in each case on the abscissa, is however scaled identically for all of the graphs and is also intended in this case to clarify the relationships that exist in this respect between the individual intermediate circuit voltage-dependent power control operations.

Each graph in FIG. 2 has, plotted on its ordinate, the power that the DC voltage intermediate circuit outputs or is able to output or should output. A positive value in this respect means that power is output from the DC voltage intermediate circuit. To where the respective power is output, or from where it is consumed in the case of negative values, then differs between the individual graphs. The absolute power values, in particular the maximum values or minimum values shown in each case, may differ between the individual graphs.

Graph A shows the proposed power behavior of the frequency converter in relation to the electricity supply grid. With the power P, the graph thus shows the power that is output from the DC voltage intermediate circuit to the electricity supply grid, that is to say is fed into the electricity supply grid. Negative power values, which are thus below the abscissa axis, thus indicate the consumption of electric power from the electricity supply grid into the DC voltage intermediate circuit.

The origin of the graph, where the two graph axes thus intersect, indicates a nominal intermediate circuit voltage $V_{INT}$ with the power value 0. If the intermediate circuit voltage thus has its nominal value, power is neither drawn from the electricity supply grid nor fed into it. If the intermediate circuit voltage $V_{INT}$ increases up to a first upper intermediate circuit voltage value $V_{INT1}^+$, then the power increases linearly to its maximum value $P_{max}$. From then on, maximum power is thus fed into the electricity supply grid from the DC voltage intermediate circuit.

If the intermediate circuit voltage $V_{INT}$ drops, specifically down to the first lower intermediate circuit voltage value $V_{INT1}^-$, then the power also drops to its minimum value $P_{min}$. The minimum power value $P_{min}$ may correspond exactly to the negative value of the maximum power value $P_{max}$. In general, it comes into consideration for the characteristic curve shown in graph A to be point-symmetrical about the origin, that is to say point-symmetrical about the point of intersection of the two coordinate axes.

Thus, depending on the intermediate circuit voltage, electric power may be drawn from the electricity supply grid or fed into it. The characteristic curve of graph A may be referred to as a droop of the line-side converter.

A power limit $P_L$ is furthermore also shown, which may possibly represent a limit on the power able to be drawn from the electricity supply grid. This limit power $P_L$ may make provision for power not to be drawn from the electricity supply grid up to the maximum value. A power drawn from the electricity supply grid is thereby able to be reduced or then limited, especially for grid support, in order ultimately also to be able to reduce the power drawn by the electrical consumer, in particular in the event of a grid fault.

Graph B then shows a droop of an electrical storage unit, which may optionally be provided for an electrical consumer under consideration. The electrical storage unit is accordingly not called upon if the intermediate circuit voltage is between the first lower and the first upper intermediate circuit voltage value $V_{INT1}^-$, $V_{INT1}^+$. Outside this range, the power increases linearly until the intermediate circuit voltage has reached the second upper intermediate circuit voltage value $V_{INT2}^+$. As the intermediate circuit voltage increases, there is then provision for the electric power to be output from the intermediate circuit to the electrical storage unit, that is to say to be stored in the electrical storage unit. If however the intermediate circuit voltage drops below the first lower intermediate circuit voltage value $V_{INT1}^-$, then the power also drops, specifically down to the second lower intermediate circuit voltage value $V_{INT2}^-$. The electrical storage unit then accordingly outputs power to the electrical intermediate circuit storage unit, and the electrical intermediate circuit storage unit thus consumes power from the energy storage unit in accordance with the characteristic curve.

In principle, it should be mentioned for all of the graphs in this FIG. 2 that the term droop relates in particular in each case to the linearly rising or falling branches and, in this respect, a linear section is present. In addition, the droops of graphs A to D are also indicated in each case in FIG. 1 for the respective component.

Graph C shows the proposed droop of the electrical consumer, that is to say in particular of the main consumer, which, according to FIG. 1, is all of the charging terminals 2 with the connected electric vehicles 4. The electrical consumer or main consumer essentially has a maximum value over a majority of the voltage range of the intermediate circuit voltage $V_{INT}$, and is thus able to receive maximum power from the electrical intermediate circuit. However, if the intermediate circuit voltage still drops further below the second lower intermediate circuit voltage value $V_{INT2}^-$, then there is provision for its power to be reduced, specifically for its power, which it draws from the DC voltage intermediate circuit of the frequency converter, to drop linearly until the intermediate circuit voltage has reached the third lower intermediate circuit voltage value $V_{INT3}^-$. It is assumed here that the electrical consumer itself in this respect does not generate any power and could return it to the DC voltage intermediate circuit. At least that is the basis of the consideration.

Graph D shows a droop for an uninterruptible power supply UPS. The uninterruptible power supply may in particular be one such as is illustrated as uninterruptible power supply 32 in FIG. 1. It receives its power from the DC voltage intermediate circuit and then supplies power to peripheral devices, in particular including control devices of the consumer or of the charging station, as illustrated for example in FIG. 1.

The graph shows that the uninterruptible power supply UPS feeds power into the DC voltage intermediate circuit only when the intermediate circuit voltage $V_{INT}$ drops below the third lower intermediate circuit voltage value $V_{INT3}^-$. The power then decreases linearly as the intermediate circuit voltage continues to drop. The uninterruptible power supply then feeds power into the DC voltage intermediate circuit.

In addition, it should be noted in particular for graphs B, D and E that slight deviations of the horizontal characteristic curve from the abscissa should not represent an actual deviation, but rather such a representation was chosen only for the sake of clarity in order to be able to visually distinguish the characteristic curve from the abscissa.

Finally, graph E shows an optional chopper that is able to consume power from the DC voltage intermediate circuit by conducting electric current through appropriate heating resistors in order thereby to destroy energy or convert it into heat.

Droops for such a chopper are shown in graph E. It may be identified there that the chopper becomes active only when the intermediate circuit voltage $V_{INT}$ has reached a very high value, which is referred to here as fourth upper intermediate circuit voltage value $V_{INT4}^+$. From then on, the power that the chopper draws from the DC voltage intermediate circuit increases to a maximum value (reached at a fifth upper intermediate circuit voltage value $V_{INT5}^+$) as the intermediate circuit voltage $V_{INT}$ continues to increase.

Figure 3:
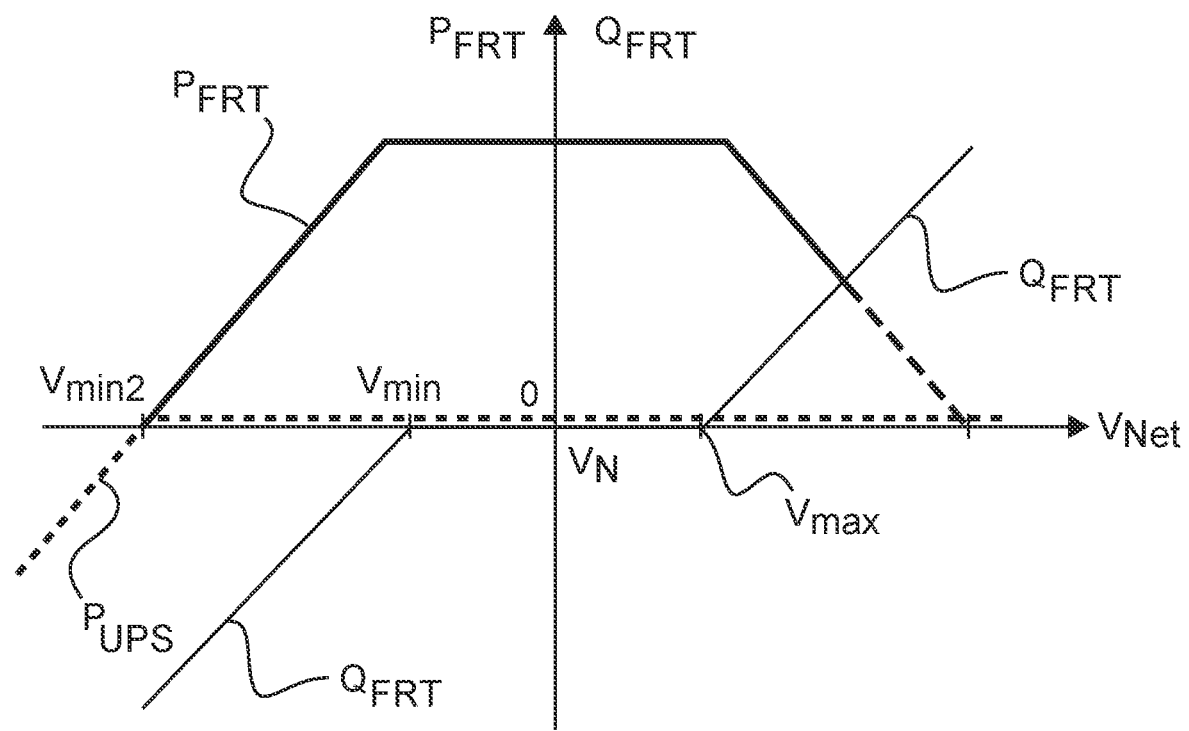
FIG. 3 shows characteristic curves for line voltage-dependent power control.

FIG. 3 shows a graph of a line voltage-dependent active power characteristic curve and a line voltage-dependent reactive power characteristic curve. It is accordingly proposed for the electrical consumer to feed reactive power $Q_{FRT}$ into the electricity supply grid or draw it therefrom on the basis of the line voltage $V_{Net}$. Accordingly, no reactive power $Q_{FRT}$ is fed in close to the nominal line voltage $V_N$. The characteristic curve is shown in this region slightly below the coordinate axis, this serving only for improved illustration. In fact, it should be on the coordinate axis in the region close to the nominal line voltage $V_N$. If the line voltage $V_{Net}$ increases to such an extent that it exceeds an upper threshold voltage $V_{max}$, then the fed-in reactive power $Q_{FRT}$ increases, in particular linearly as the line voltage continues to increase. Likewise, particularly point-symmetrically about the origin of the coordinate system that is shown, a reactive power $Q_{FRT}$ is drawn from the electricity supply grid as soon as the line voltage $V_{Net}$ drops below a lower threshold voltage $V_{min}$. In particular, the amount of this drawn reactive power increases linearly as the line voltage continues to drop. The fed-in reactive power $Q_{FRT}$ is thus negative, and likewise drops concomitantly as the line voltage continues to drop.

At the same time, the active power $P_{FRT}$ consumed by the electrical consumer, in particular a main consumer, is illustrated. Accordingly, the consumed electric power adopts a maximum value in the region of the dead band of the reactive power infeed, that is to say between the lower voltage threshold value $V_{min}$ and the upper voltage threshold value $V_{max}$. The electrical consumer is in this case in a normal state in which it consumes maximum power in a manner as unchanged as possible. This power value may also be different from the maximum possible power. In particular, the consumer in this case consumes electric power to the extent that it makes sense for it to operate at the time, regardless of the electrical line voltage $V_{Net}$. If the line voltage $V_{Net}$ then rises above the upper threshold value $V_{max}$, it is proposed to reduce the drawn active power as the line voltage increases, in particular to reduce it linearly. Toward the end of the characteristic curve, this is shown in dashed form in order to make it clear that, if the voltage deviation of the line voltage is too high, a shutdown may possibly already come in consideration before the active power consumed has dropped to the value 0.

In a quite similar way, the power consumed by the electrical consumer also decreases when the line voltage has dropped below the lower threshold voltage $V_{min}$. It is in particular proposed for the power then to decrease linearly as the line voltage continues to drop, in particular such that it is reduced to the value 0.

The voltage range between the lower threshold voltage $V_{min}$ and the upper threshold voltage $V_{max}$ may thus also be referred to as dead band region, at least with regard to the reactive power characteristic curve. It may also be assumed here that a grid fault is present and is also detected accordingly as soon as the line voltage is outside this dead band region, that is to say is above the upper threshold voltage $V_{max}$ or below the lower threshold voltage $V_{min}$.

With regard to the consumed power $P_{FRT}$, this is therefore not reduced within the dead band region. In principle, however, it also comes into consideration for the region in which power $P_{FRT}$ is not reduced not to correspond to the dead band region of the reactive power characteristic curve, but rather to be able to be larger or smaller. It preferably ranges from a line voltage value below the lower threshold voltage $V_{min}$ up to a voltage value above the upper threshold value $V_{max}$. It is thereby in particular possible to achieve a situation whereby, initially, an excessively great voltage deviation, which is indicative of a grid fault, is counteracted through a corresponding reactive power infeed or draw. If the deviation of the voltage from the nominal voltage increases further, then it comes into consideration to additionally change the active power on the basis of the line voltage.

It is particularly important here that the electrical consumer takes part in grid support measures. It should also be emphasized here in particular not only that the electrical consumer is able to reduce its consumed power as active power, but also that it is additionally able to control the voltage via a reactive power infeed.

In addition, provision is also made for an uninterruptible power supply UPS that is able to provide a power, in particular is able to feed it into the DC voltage intermediate circuit, when the consumed power $P_{FRT}$ of the electrical consumer has already reached the value 0. This active power of the uninterruptible power supply $P_{UPS}$ may be used in particular to provide active power required for generating reactive power. In particular, active power may be required in order to compensate power loss that occurs when reactive power is fed in. Power required for the peripherals, such as control devices (controller) and process computers, may also be provided by the uninterruptible power supply.

According to FIG. 3, the active power $P_{FRT}$, when the line voltage drops, attains the value 0 at a second lower threshold voltage $V_{min2}$ If the line voltage continues to drop, the reactive power $Q_{FRT}$ also decreases further, wherein power is required for controlling or supporting this, and therefore the power $P_{UPS}$ drawn from the DC voltage intermediate circuit by the uninterruptible power supply is likewise further reduced as the line voltage drops further, in particular linearly with the dropping line voltage. However, this means that the active power $P_{UPS}$ of the uninterruptible power supply, which is fed into the DC voltage intermediate circuit, or is provided in some other way by the uninterruptible power supply, increases.

The uninterruptible power supply may in this case too thus be integrated into the electrical consumer or its control system in a particularly simple and expedient manner such that the proposed support measures are able to be implemented by corresponding reactive power infeed and by corresponding active power reduction by using power from the uninterruptible power supply.

It is known in principle to support the electricity supply grid, which may also be referred to simply as grid, in the event of grid faults by way of modern wind power installations and, in particular, to control the wind power installations through the fault as far as possible without disconnection from the grid, which is also generally referred to as "fault ride-through" (FRT).

It is proposed to prepare electrical consumers, in particular charging stations, to be controlled through a grid fault. In this case, it is preferably proposed to ensure the supply of power to the consumer up to a predetermined residual voltage in the event of a fault, in particular up to a voltage dip of less than 50% of the nominal line voltage, via an intermediate circuit-coupled UPS. It was not hitherto known to ride through a grid fault with dynamic voltage support in pure load operation, that is to say when the electrical consumer does not have an electrical storage unit, since the intermediate circuit is no longer able to be charged sufficiently from the grid in the event of a voltage dip, that is to say is not able to follow the behavior of the grid.

In order nevertheless to ride through a grid fault with an electrical consumer, in particular in the event of an undervoltage, with dynamic grid support, the following aspects are proposed, at least according to one embodiment:

A supply of power to the peripheral, in particular including control devices, has to be provided. A further aspect is to provide a rapid power reduction of the load or, according to one embodiment, at least partial coverage of the power that the load requires or is currently consuming from a storage unit. What is proposed is a rapid increase in load when the voltage recovers, in particular such that a power value following the grid fault is set to a power value prior to the grid fault. It has also been identified and proposed for coverage of converter losses to be able to be provided in the case of dynamic grid support, that is to say in particular in order to be able to perform a dynamic reactive power infeed.

An important part of the inventive idea, at least according to one embodiment, is a grid follower mode in which the load, that is to say the consumer, follows the grid.

To this end, a storage unit or load connected to a DC voltage intermediate circuit, or simply intermediate circuit, may be provided. The load, or the consumer, thus behaves on the basis of the possible voltage-dependent exchange power with the grid. The power that the load draws from the grid is therefore not based on the needs of the load, but rather on the needs of the grid.

To this end, a distinction is drawn between two variants in particular, the first of which provides a frequency converter without an electrical storage unit in the intermediate circuit, which is referred to as load operation. The second variant provides a frequency converter with an electrical storage unit in the intermediate circuit, which is referred to as charging operation.

The following is provided in load operation:

The load receives, from the intermediate circuit, a fault power $P_{FRT}$ that is limited for riding through the grid fault. The power that the load receives from the intermediate circuit is thus reduced, and it is reduced such that the intermediate circuit voltage does not collapse.

The peripheral is supplied with power from the intermediate circuit by an uninterruptible power supply UPS. The UPS is thus connected to the intermediate circuit and is still able to supply the peripherals even if the intermediate circuit voltage drops.

However, if the intermediate circuit voltage drops below a predetermined value, the load changes its power consumption in accordance with droops, according to which a setpoint power is predefined on the basis of the intermediate circuit voltage.

In the case of low intermediate circuit voltages, particularly if the intermediate circuit voltage drops below a predetermined first lower voltage limit value, it is proposed to limit a dynamic support current on the basis of the residual voltage of the intermediate circuit. This is intended to ensure that the losses that occur are covered as far as possible.

When the residual voltage of the intermediate circuit is very low, if the intermediate circuit voltage drops below a predetermined second lower voltage limit value, no further active power is drawn and grid support continues to be performed only through a reactive power infeed.

To this end, it is proposed to use an uninterruptible power supply coupled to the intermediate circuit, which may also be referred to as an intermediate circuit UPS, and has a small storage unit (battery), as well as a DC/DC converter, in order to be able to feed power into the intermediate circuit. The intermediate circuit UPS is in this case designed to cover only the converter losses during the fault ride-through (FRT).

As an alternative, a variant is proposed which, on the load side, is not exclusively based on a detected voltage, but rather uses communication: To this end, the frequency converter regulates the intermediate circuit voltage and reports to the load a possible exchange active power that the load is able to draw from the intermediate circuit. This may be performed on the basis of the line voltage or when current limits are reached. The possible exchange active power that the load is able to draw from the intermediate circuit therefore depends on the line voltage and the reactive power fed in or drawn. This means that internal communication takes place between the frequency converter and the load.

The following is provided for the charging operation:

First of all, it is made possible for power also to be able to be drawn from a storage unit, which is however preferably provided only for its own use, that is to say as far as possible not for infeed purposes.

The exchange power in the event of a grid fault, which is therefore exchanged between the intermediate circuit and the consumer or the load, in particular a main consumer, may also be negative. In this case, the consumer that has the storage unit feeds back into the intermediate circuit. As far as possible, however, active power is thus not fed into the grid, but reactive power Q may be fed in.

Droops are proposed that predefine a power setpoint value for the exchange power on the basis of the intermediate circuit voltage. These droops are in this case not limited only to the region in which power is output from the intermediate circuit to the load, but they also concern the region in which power is returned from the load to the intermediate circuit. These droops thus concern an intermediate circuit voltage from below to above a nominal intermediate circuit voltage and range in this case from a negative exchange power to a positive exchange power.

The energy storage unit of the intermediate circuit with a current limit may therefore be sufficient to ride through the grid fault, such that an intermediate circuit UPS and/or load reduction are not absolutely necessary.

It is also proposed to achieve a quick restoration of the pre-fault state following the grid fault. To this end, the state prior to the grid fault, specifically in particular the level of the active power drawn from the grid immediately before the grid fault, may for example be stored. Following the grid fault, the power consumption should then as far as possible be set to the previous state prior to the grid fault, specifically in particular via a power ramp via which the power is able to be returned to the pre-fault state, which may also be referred to as ramping back.

It is therefore preferably proposed, in order to set the power consumption to the level of the pre-fault value after the grid fault has ended, for the power consumption to be set via a predefined change curve, in particular via a temporal ramp function with which the power consumption is changed linearly up to the level of the pre-fault value.

The invention claimed is:

1. A method for controlling an electrical consumer, comprising:
monitoring an electricity supply grid for a grid fault during which a line voltage of the electricity supply grid deviates from a nominal line voltage of the electricity supply grid by at least a first differential voltage, wherein the electrical consumer is coupled to the electricity supply grid using a frequency converter;
in response to detecting the grid fault, retaining coupling between the electrical consumer and the electricity supply grid; and
changing a power consumption of the electrical consumer based on a deviation of the line voltage from the nominal line voltage, wherein:
the frequency converter has a DC voltage intermediate circuit,
the DC voltage intermediate circuit has an intermediate circuit voltage,
the intermediate circuit voltage depends on the deviation of the line voltage from the nominal line voltage, and
at least one power control operation is provided on the basis of the intermediate circuit voltage.

2. The method as claimed in claim 1, wherein:
the electrical consumer includes has at least one main consumer having power consumption that is controllable, and at least one auxiliary device having power consumption that is not controllable, and
the method comprises:
in response to detecting the grid fault, supplying the at least one auxiliary device with electric power using an uninterruptible power supply irrespective of the deviation of the line voltage; and
supplying the main consumer with electric power from the electricity supply grid on the basis of the deviation of the line voltage.

3. The method as claimed in claim 1, wherein:
the first differential voltage is at least 10% of the nominal line voltage, and/or
the method comprises:
disconnecting the electrical consumer from the electricity supply grid when the line voltage is below the nominal line voltage by more than a second differential voltage, wherein the second differential voltage is greater than the first differential voltage and is at least 50% of the nominal line voltage.

4. The method as claimed in claim 3, wherein the first differential voltage is at least 20% of the nominal line voltage, and the second differential voltage is at least 70% of the nominal line voltage.

5. The method as claimed in claim 1, wherein:
the electrical consumer includes a battery, and
the method comprises:
in response to detecting the grid fault, causing the battery to feed electric power into the DC voltage intermediate circuit to power the electrical consumer, power at least one auxiliary device, or feed reactive power into the electricity supply grid.

6. The method as claimed in claim 1, wherein when the grid fault occurs, the frequency converter feeds reactive power into the electricity supply grid, and wherein:
the reactive power is fed in using a support current, and the support current is limited based on the line voltage, and/or
active power for performing the reactive power infeed is:
released by the electrical consumer by reducing the power consumption of the electrical consumer,
provided by a battery, and/or
provided by the electricity supply grid.

7. The method as claimed in claim 1, comprising:
performing, by the frequency converter, intermediate circuit control to regulate the intermediate circuit voltage to a predefined intermediate circuit voltage value;
determining, by the frequency converter, an available exchange power; and
transmitting the available exchange power to the electrical consumer, wherein a communication device is provided for communication between the frequency converter and the electrical consumer.

8. The method as claimed in claim 1, further comprising:
storing the power consumption of the electrical consumer prior to the grid fault as a pre-fault value; and
setting the power consumption of the electrical consumer to the pre-fault value after the grid fault has ended.

9. The method as claimed in claim 8, wherein setting the power consumption to the pre-fault value after the grid fault has ended includes setting the power consumption based on a curve that is a temporal ramp function having the power consumption changed linearly up to the pre-fault value.

10. The method as claimed in claim 8, wherein an electrical storage unit sets the pre-fault value.

11. The method as claimed in claim 10, wherein when the electrical consumer is a charging station for charging electric vehicles, at least one storage unit of at least one electric vehicle connected to the charging station sets the pre-fault value.

12. The method as claimed in claim 1, wherein the electrical consumer is an electric charging station for charging electric vehicles.

13. The method as claimed in claim 1, wherein
the electrical consumer is configured as a support consumer that uses the frequency converter to support the electricity supply grid, wherein the electrical consumer supports the electricity supply grid based on a presence of at least one parallel consumer feeding into the electricity supply grid, and
wherein:
the support consumer identifies a grid disconnection of the at least one parallel consumer,
the support consumer changes the power consumption based on the deviation of the line voltage such that a total power consumption of the at least one parallel consumer and the power consumption of the support consumer change in accordance with a predefined total power change, and/or
after the grid fault has ended, the support consumer sets an infeed power such that the total power consumption reaches a sum of pre-fault values of the support consumer and the at least one parallel consumer.

14. The method as claimed in claim 1, wherein the at least one power control operation is from a list including:

the power consumption of the electrical consumer is controlled on the basis of the intermediate circuit voltage, the power consumption of the electrical consumer is controlled depending on predefined consumer droop, wherein the predefined consumer droop specifies a linear relationship between the power consumption of the electrical consumer and the intermediate circuit voltage or a range of intermediate circuit voltages including the intermediate circuit voltage, a power consumption or power output of an uninterruptible power supply is controlled on the basis of the intermediate circuit voltage, the power consumption or power output of the uninterruptible power supply is controlled depending on predefined uninterruptible power supply (UPS) droop, wherein the predefined UPS droop specifies a linear relationship between the power consumption or output of the UPS and the intermediate circuit voltage or the range of intermediate circuit voltages including the intermediate circuit voltage, a power consumption or power output of a battery storage unit is controlled on the basis of the intermediate circuit voltage, and the power consumption or power output of the battery storage unit is controlled depending on predefined storage unit droop, wherein the predefined storage unit droop specify specifies a linear relationship between the power consumption or output of the battery unit and the intermediate circuit voltage or the range of intermediate circuit voltages including the intermediate circuit voltage.

15. A charging station for electric vehicles, comprising:
a frequency converter configured to couple the charging station to an electricity supply grid having a line voltage and associated with a nominal line voltage;
a monitoring controller configured to monitor the electricity supply grid for a grid fault in which the line voltage deviates from the nominal line voltage by at least a first differential voltage;
an operating controller configured to control the charging station such that the charging station remains coupled to the electricity supply grid when the grid fault occurs; and
a power controller configured to change a power consumption of the charging station based on a deviation of the line voltage from the nominal line voltage, wherein:
the frequency converter has a DC voltage intermediate circuit having an intermediate circuit voltage,
the intermediate circuit voltage depends on the line voltage, and
at least one power control operation is provided on the basis of the intermediate circuit voltage from a list including:
the power consumption of the charging station is controlled based on the intermediate circuit voltage,
the power consumption of the charging station is controlled based on predefined consumer droop that specifies a linear relationship between the power consumption of the charging station and the intermediate circuit voltage or a range of intermediate circuit voltages including the intermediate circuit voltage, a power consumption or power output of an uninterruptible power supply (UPS) is controlled based on the intermediate circuit voltage, the power consumption or the power output of the uninterruptible power supply is controlled based on predefined UPS droop, wherein the predefined UPS droop specifies a linear relationship between the power consumption or output of the uninterruptible power supply and the intermediate circuit voltage or the range of intermediate circuit voltages including the intermediate circuit voltage, a power consumption or power output of a battery is controlled based on the intermediate circuit voltage, and the power consumption or the power output of the battery is controlled based on predefined battery droop, wherein the predefined battery droop specifies a linear relationship between the power consumption or output of the battery and the intermediate circuit voltage or the range of intermediate circuit voltages including the intermediate circuit voltage.

16. The charging station as claimed in claim 15, wherein: the charging station has at least one main consumer having power consumption that is controllable and at least one auxiliary device having power consumption that is not controllable, the uninterruptible power supply is used and when the grid fault occurs, the at least one auxiliary device is supplied with electric power using the uninterruptible power supply irrespective of the deviation of the line voltage from the nominal line voltage, and the main consumer is supplied with electric power from the electricity supply grid based on the line voltage.

17. The charging station as claimed in claim 15, comprising:
the battery configured to, when the grid fault occurs, feed electric power into the DC voltage intermediate circuit to feed reactive power into the electricity supply grid or power at least one of the charging station or at least one auxiliary device.

18. A method for controlling an electrical consumer, comprising:
monitoring an electricity supply grid for a grid fault during which a line voltage of the electricity supply grid deviates from a nominal line voltage of the electricity supply grid by at least a first differential voltage, wherein the electrical consumer is coupled to the electricity supply grid using a frequency converter;
in response to detecting the grid fault, retaining coupling between the electrical consumer and the electricity supply grid; and
changing a power consumption of the electrical consumer based on a deviation of the line voltage from the nominal line voltage, wherein the electrical consumer includes has at least one main consumer having power consumption that is controllable, and at least one auxiliary device having power consumption that is not controllable, and the method comprises:
in response to detecting the grid fault, supplying the at least one auxiliary device with electric power using an uninterruptible power supply irrespective of the deviation of the line voltage; and
supplying the at least one main consumer with electric power from the electricity supply grid on the basis of the deviation of the line voltage.

* * * * *